United States Patent
Han et al.

(10) Patent No.: US 7,511,395 B2
(45) Date of Patent: Mar. 31, 2009

(54) HYBRID INDUCTION MOTOR

(75) Inventors: Seung Do Han, Incheon (KR); Hyoun Jeong Shin, Incheon (KR); Jae Hong Ahn, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 497 days.

(21) Appl. No.: 11/275,257

(22) Filed: Dec. 21, 2005

(65) Prior Publication Data

US 2006/0131984 A1 Jun. 22, 2006

(30) Foreign Application Priority Data

Dec. 21, 2004 (KR) .................... 10-2004-0109771

(51) Int. Cl.
*H02K 16/02* (2006.01)
*H02K 17/02* (2006.01)
(52) U.S. Cl. ............... 310/114; 310/126; 310/156.25; 310/166; 310/266
(58) Field of Classification Search ............... 310/114, 310/126, 266, 166, 156.25
See application file for complete search history.

(56) References Cited

U.S. PATENT DOCUMENTS

| | | | | |
|---|---|---|---|---|
| 2,864,017 | A | * | 12/1958 | Waltscheff .................. 310/126 |
| 3,614,494 | A | * | 10/1971 | Borchers et al. ............... 310/56 |
| 4,745,318 | A | | 5/1988 | Ivanics |
| 5,675,203 | A | * | 10/1997 | Schulze et al. ............... 310/113 |
| 6,380,653 | B1 | * | 4/2002 | Seguchi ..................... 310/112 |
| 2004/0080237 | A1 | | 4/2004 | Han et al. |
| 2005/0212380 | A1 | * | 9/2005 | Caroon ....................... 310/266 |
| 2006/0226722 | A1 | * | 10/2006 | Kim et al. .................... 310/114 |

FOREIGN PATENT DOCUMENTS

| | | |
|---|---|---|
| DE | 1 9548117 | 8/1996 |
| DE | 1 9821632 | 11/1999 |
| EP | 1416616 | 5/2004 |
| JP | 5-219698 | * 8/1993 |

OTHER PUBLICATIONS

U.S. Appl. No. 11/325,503 to Lee et al., filed Jan. 5, 2006.
U.S. Appl. No. 11/325,301 to Kim et al., filed Jan. 5, 2006.
English language Abstract of DE 19548117, Aug. 1996.
English language Abstract of DE 19821632, Nov. 1999.

* cited by examiner

*Primary Examiner*—Burton Mullins
(74) *Attorney, Agent, or Firm*—Greenblum & Bernstein, P.L.C.

(57) ABSTRACT

A hybrid induction motor comprises a stator fixedly installed in a casing, an induction rotor rotatably inserted into a center of the stator and having a shaft at a center thereof, a first synchronous rotor slid in a longitudinal direction of the shaft between the stator and the induction rotor and free-rotatably installed in a circumferential direction of the shaft, and a second synchronous rotor facing the first synchronous rotor, slid in a longitudinal direction of the shaft between the stator and the induction rotor, and free-rotatably installed in a circumferential direction of the shaft.

18 Claims, 8 Drawing Sheets

HYBRID INDUCTION MOTOR

BACKGROUND OF THE INVENTION

1. Field of the Invention

The present invention relates to a hybrid induction motor, and more particularly, to a hybrid induction motor capable of improving a starting function and facilitating to implement a variable speed rotation.

2. Description of the Background Art

A hybrid induction motor refers to a motor in which a permanent magnet (hereinafter, will be referred to as a 'synchronous rotor') is free-rotatably installed between a stator and an induction rotor thus to be electro-magnetically coupled thereto.

FIG. 1 is a longitudinal section view showing a hybrid induction motor in accordance with the conventional art, and FIG. 2 is a sectional view taken along line I-I of FIG. 1.

As shown, in a conventional hybrid induction motor 10, a stator 11 is fixedly-disposed at an inner side of a casing 10a, and a synchronous rotor 14 is rotatably disposed at an inner side of the stator 11. An induction rotor 13 is rotatably disposed at an inner side of the synchronous rotor 14. Also, a rotation shaft 15 for outputting a rotation force of the induction rotor 13 outwardly is press-fit into a center of the induction rotor 13.

The stator 11 is formed of a laminated silicon steel, and a plurality of slots 16a for winding a driving coil 16 that generates a rotating magnetic field are formed at an inner circumferential surface of the stator 11.

The synchronous rotor 14 comprises a magnet portion 14a freely rotatable between the stator 11 and the induction rotor 13, a magnet support portion 14b for supporting the magnet portion 14a, and a bearing portion 14c for supporting the magnet support portion 14b to freely rotate around the rotation shaft 15.

The induction rotor 13 is formed as a squirrel cage rotor comprising a plurality of through holes 13a formed in the laminated silicon steel with, conductive bars 13b inserted into each through hole 13a, and end rings 13c formed at both ends of each conductive bar 13b. An unexplained reference numeral 15a denotes a shaft bearing.

An operation of the conventional hybrid induction motor will be explained.

Once a rotating magnetic field is formed as a first current is sequentially applied to the driving coil 16 of the stator 11, the synchronous rotor 14 is synchronized by the rotating magnetic field thereby to be rotated at a synchronous speed. A magnetic flux generated from the magnet portion 14a of the synchronous rotor 14 serves as a rotating magnetic field of the induction rotor 13, so that the induction rotor 13 is rotated.

Herein, the rotation shaft 15 coupled to the induction rotor 13 is rotated together with the induction rotor 13 thereby to transmit a rotation force to other components such as a fan.

However, in the conventional hybrid induction motor 10, a single synchronous rotor is implemented under a state that a magnetic flux density of an air gap between the induction rotor and the synchronous rotor is almost constant. Therefore, a starting torque of the synchronous rotor 14 is not sufficient, and thus a great current has to be applied to the driving coil 16 at the time of an initial driving of the induction motor.

Furthermore, even if a voltage applied to the driving coil 16 is varied, a varied amount of the magnetic flux density of the air gap is reduced, resulting in a difficulty in speed-varying the induction motor. Accordingly, an efficiency of the motor is degraded and the motor has limited functions.

BRIEF DESCRIPTION OF THE INVENTION

Therefore, an object of the present invention is to provide a hybrid induction motor capable of lowering a starting current required to start a synchronous rotor and thus enhancing an efficiency thereof.

Another object of the present invention is to provide a hybrid induction motor capable of varying a rotation speed of an induction rotor.

To achieve these and other advantages and in accordance with the purpose of the present invention, as embodied and broadly described herein, there is provided a hybrid induction motor, comprising: a stator fixedly installed in a casing; an induction rotor rotatably inserted into a center of the stator and having a shaft at a center thereof; a first synchronous rotor slid in a longitudinal direction of the shaft between the stator and the induction rotor and free-rotatably installed in a circumferential direction of the shaft; and a second synchronous rotor facing the first synchronous rotor, slid in a longitudinal direction of the shaft between the stator and the induction rotor, and free-rotatably installed in a circumferential direction of the shaft.

The first synchronous rotor comprises a first support portion to a center thereof a shaft is rotatably coupled, a first magnet portion coupled to an end of the first support portion in a circumferential direction and rotated by a rotating magnetic field of the stator for rotating the induction rotor, and a first bearing portion disposed at the center of the first support portion for inserting the shaft.

The second synchronous rotor comprises a second support portion to a center thereof a shaft is rotatably coupled, a second magnet portion coupled to an end of the second support portion in a circumferential direction and rotated by a rotating magnetic field of the stator for rotating the induction rotor, and a second bearing portion disposed at the center of the second support portion for inserting the shaft.

The first bearing portion is an oilless bearing, the first support portion is a non-magnetic substance, the second bearing portion is an oilless bearing, and the second support portion is a non-magnetic substance.

The first support portion and the first magnet portion are integrally formed, and the second support portion and the second magnet portion are integrally formed.

A length of the first magnet portion in a shaft longitudinal direction is relatively longer than a length of the second magnet portion in a shaft longitudinal direction.

The first magnet portion of the first synchronous rotor and the second magnet portion of the second synchronous rotor can maintain a predetermined gap therebetween by an intermediate part, or an end of the first magnet portion and an end of the second magnet portion can come in contact with each other.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention examples of which are illustrated in the accompanying drawings.

Hereinafter, a hybrid induction motor according to the present invention will be explained with reference to the attached drawings.

Figure 1:
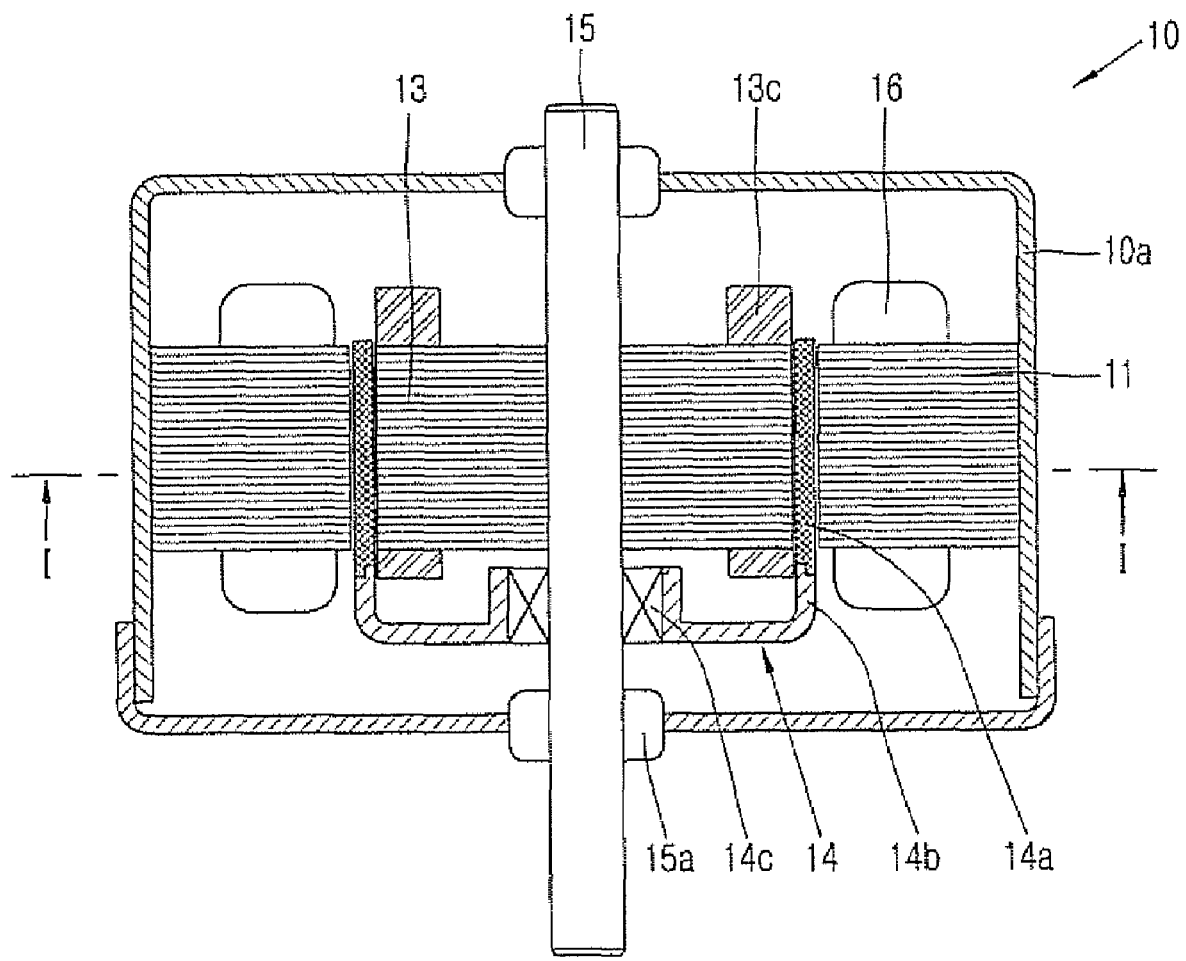
FIG. 1 is a longitudinal section view showing a hybrid induction motor in accordance with the conventional art.
Figure 2:
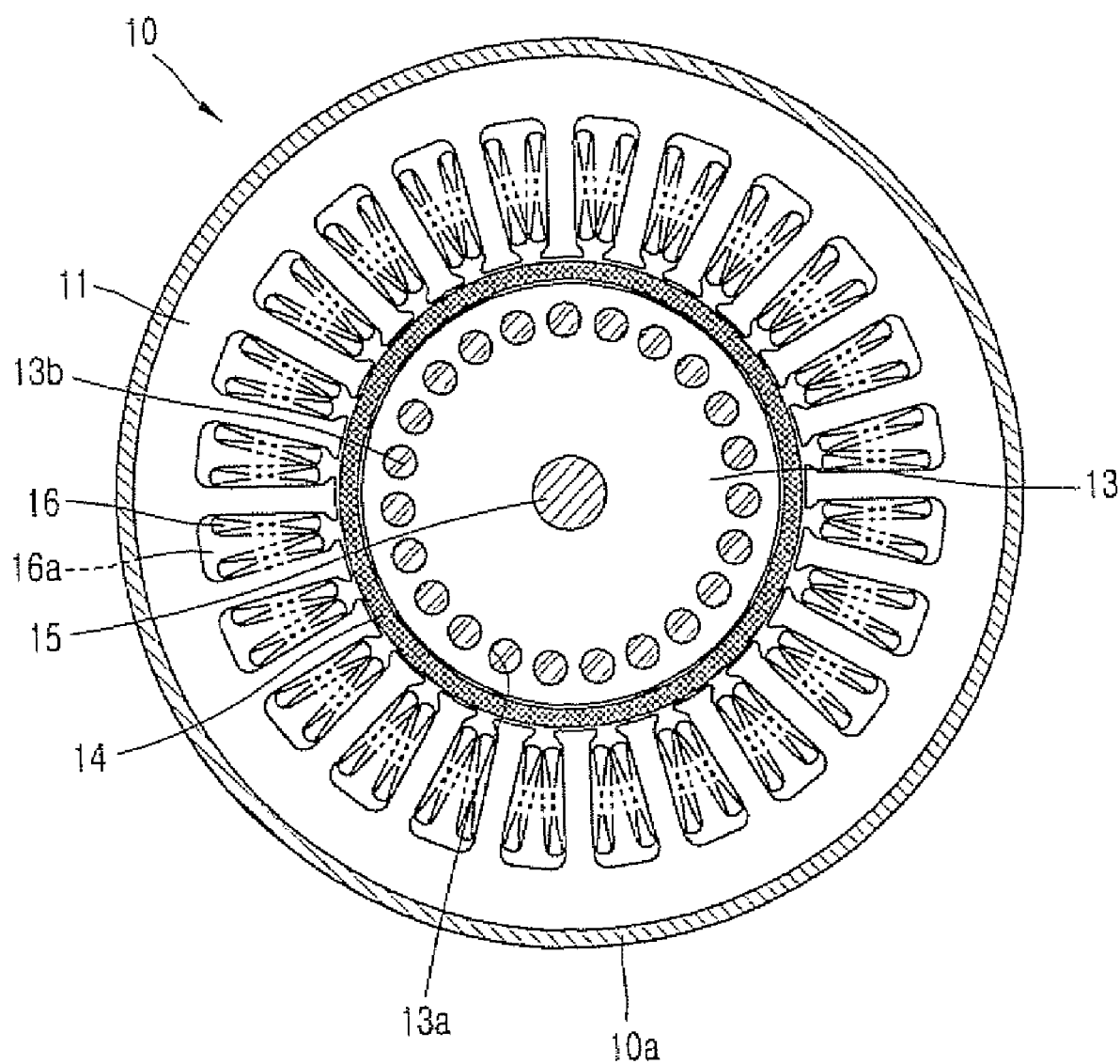
FIG. 2 is a sectional view taken along line I-I of FIG. 1.
Figure 3:
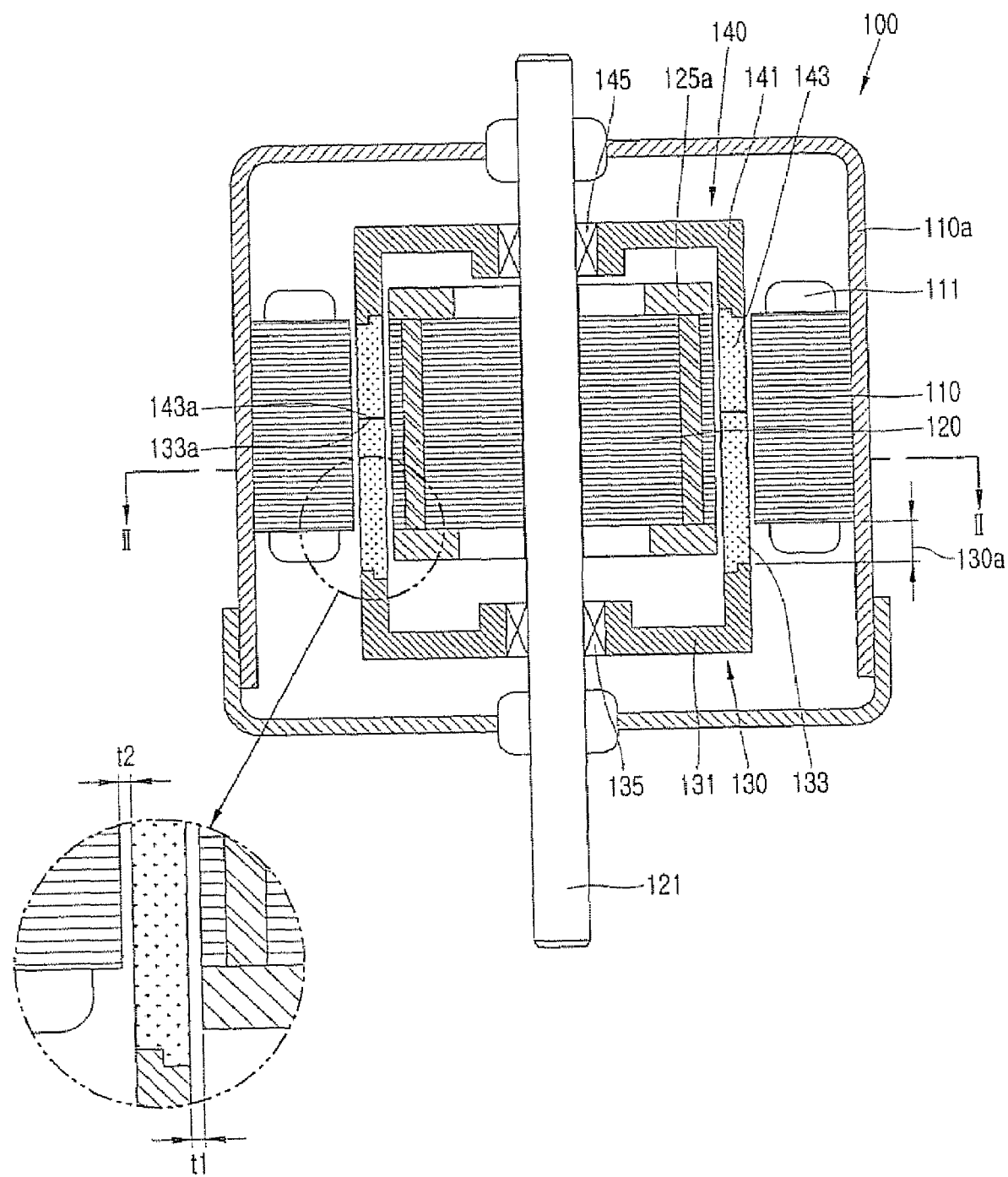
FIG. 3 is a longitudinal section view showing a hybrid induction motor according to a first embodiment of the present invention.
Figure 4:
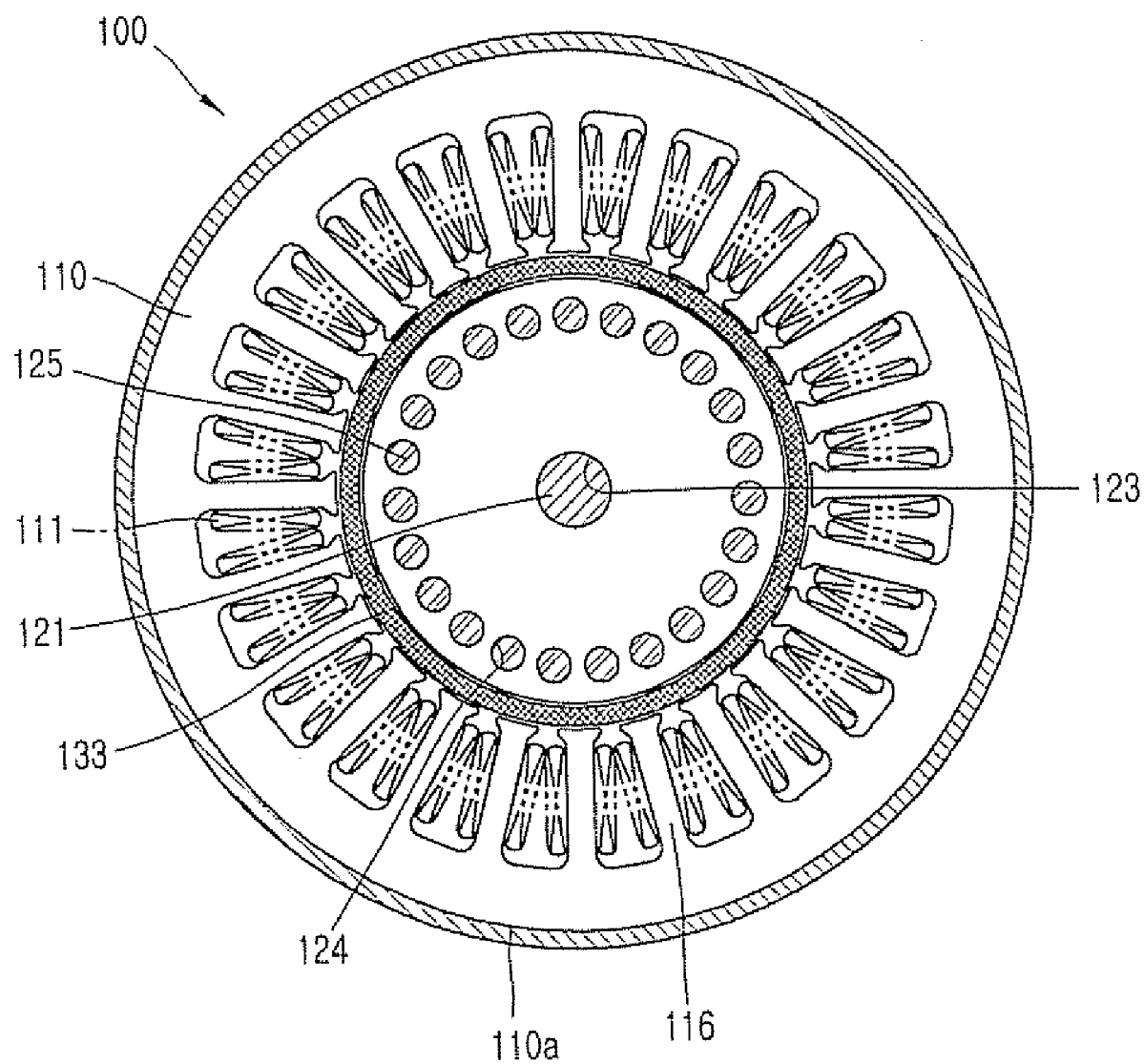
FIG. 4 is a sectional view taken along line II-II of FIG. 3.
Figure 5:
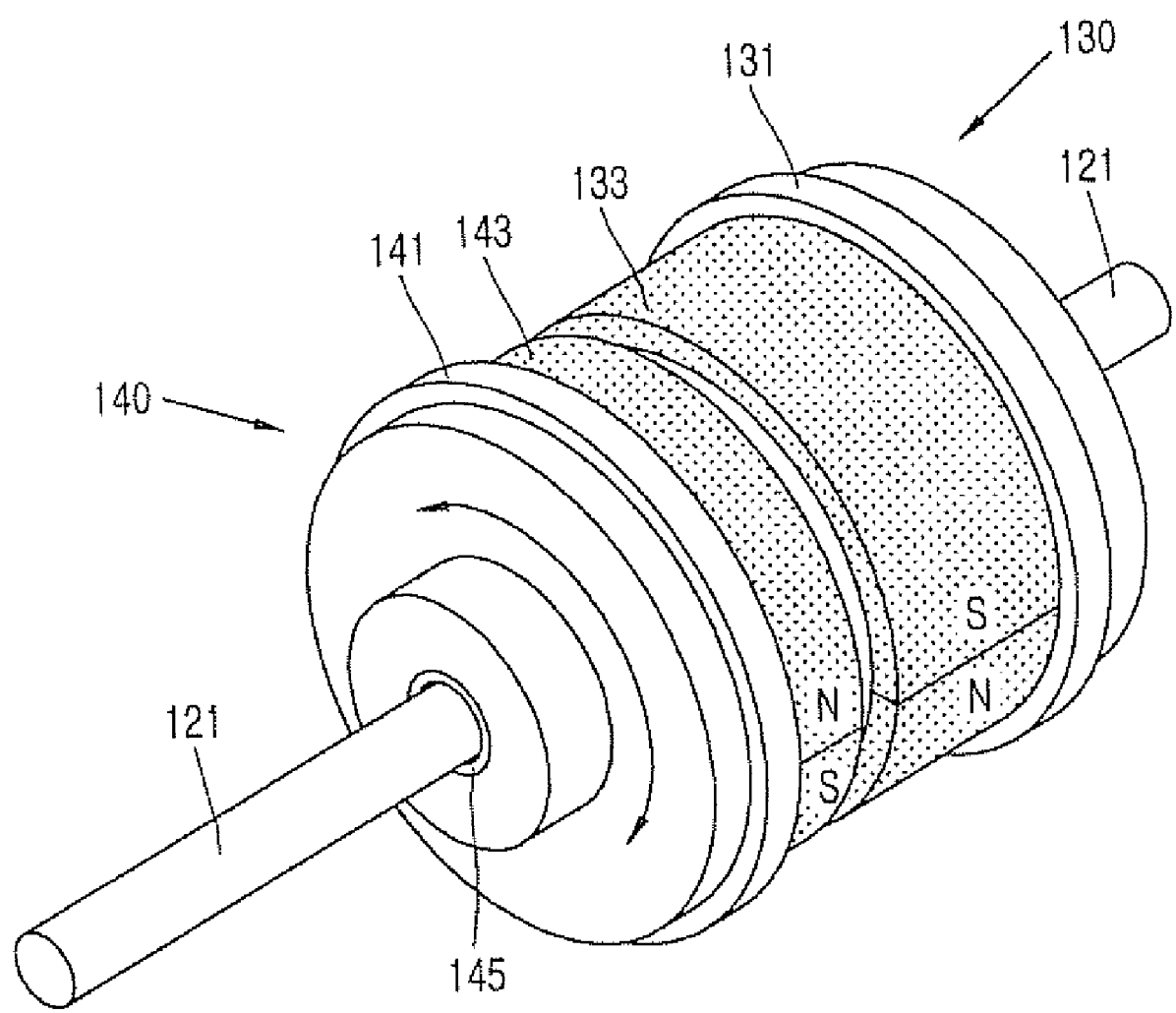
FIG. 5 is a perspective view showing a synchronous rotor and an induction rotor in the hybrid induction motor according to a first embodiment of the present invention.
Figure 6:
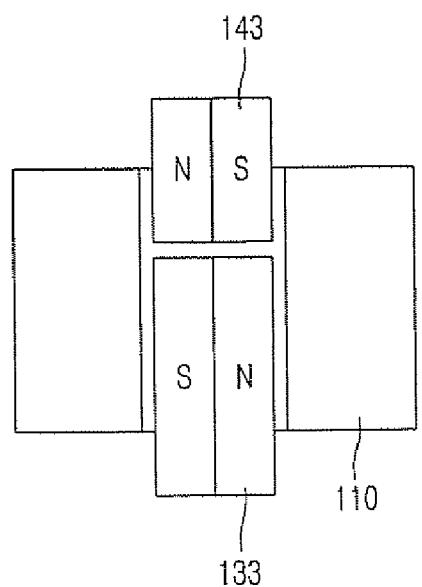
FIGS. 6 to 8 are schematic views showing each position of a first synchronous rotor and a second synchronous rotor at the time of starting and speed-varying the hybrid induction motor according to a first embodiment of the present invention.
Figure 7:
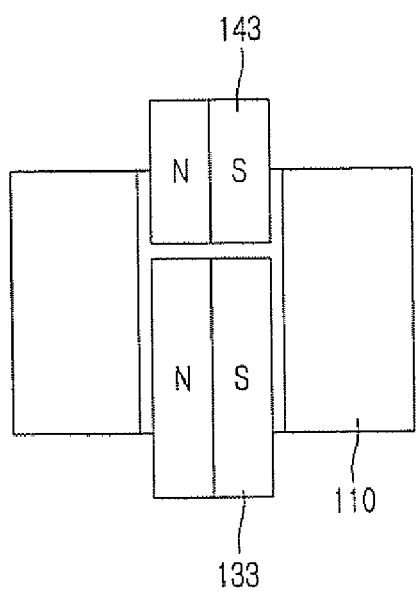
Figure 8:
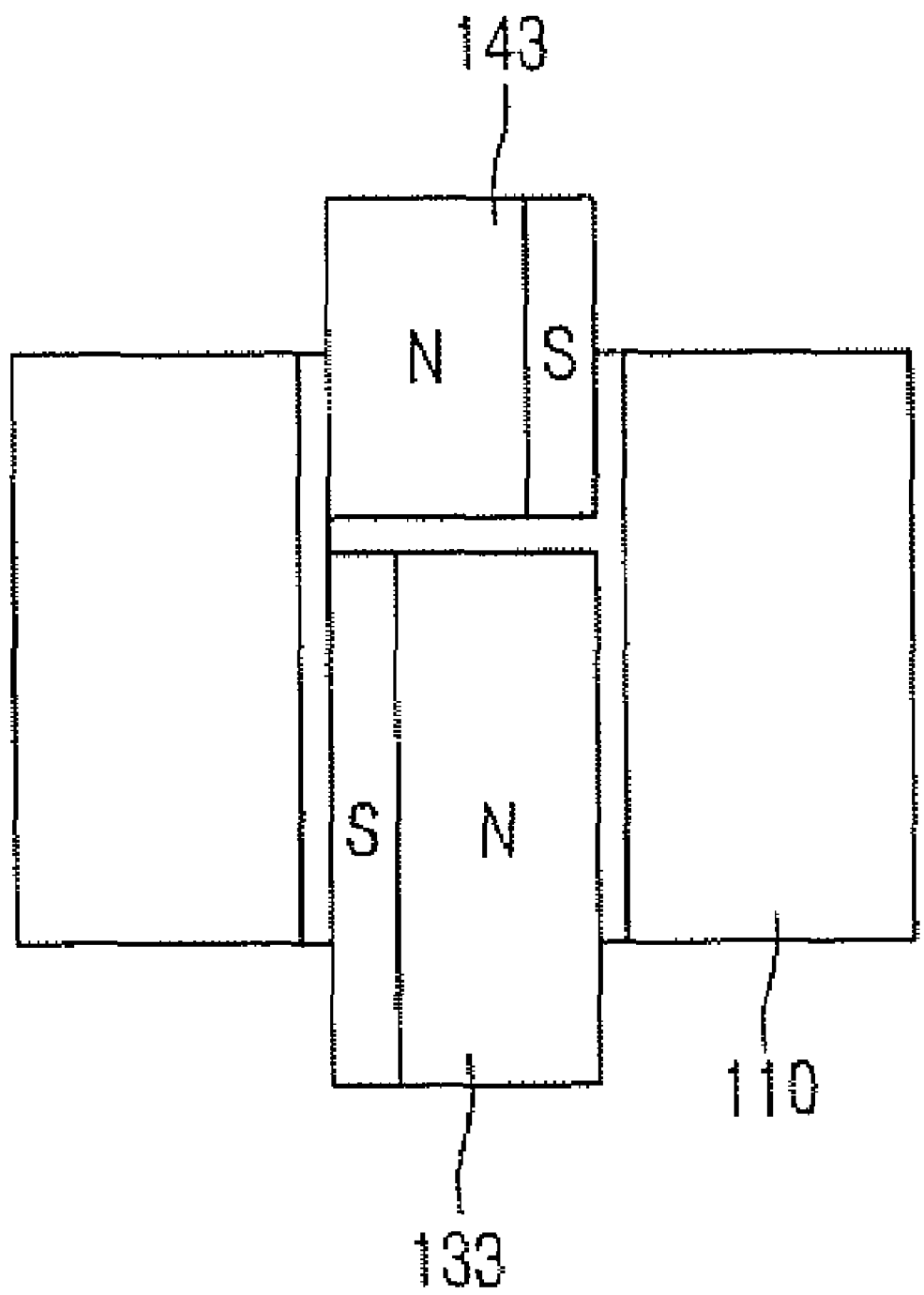
Figure 9:
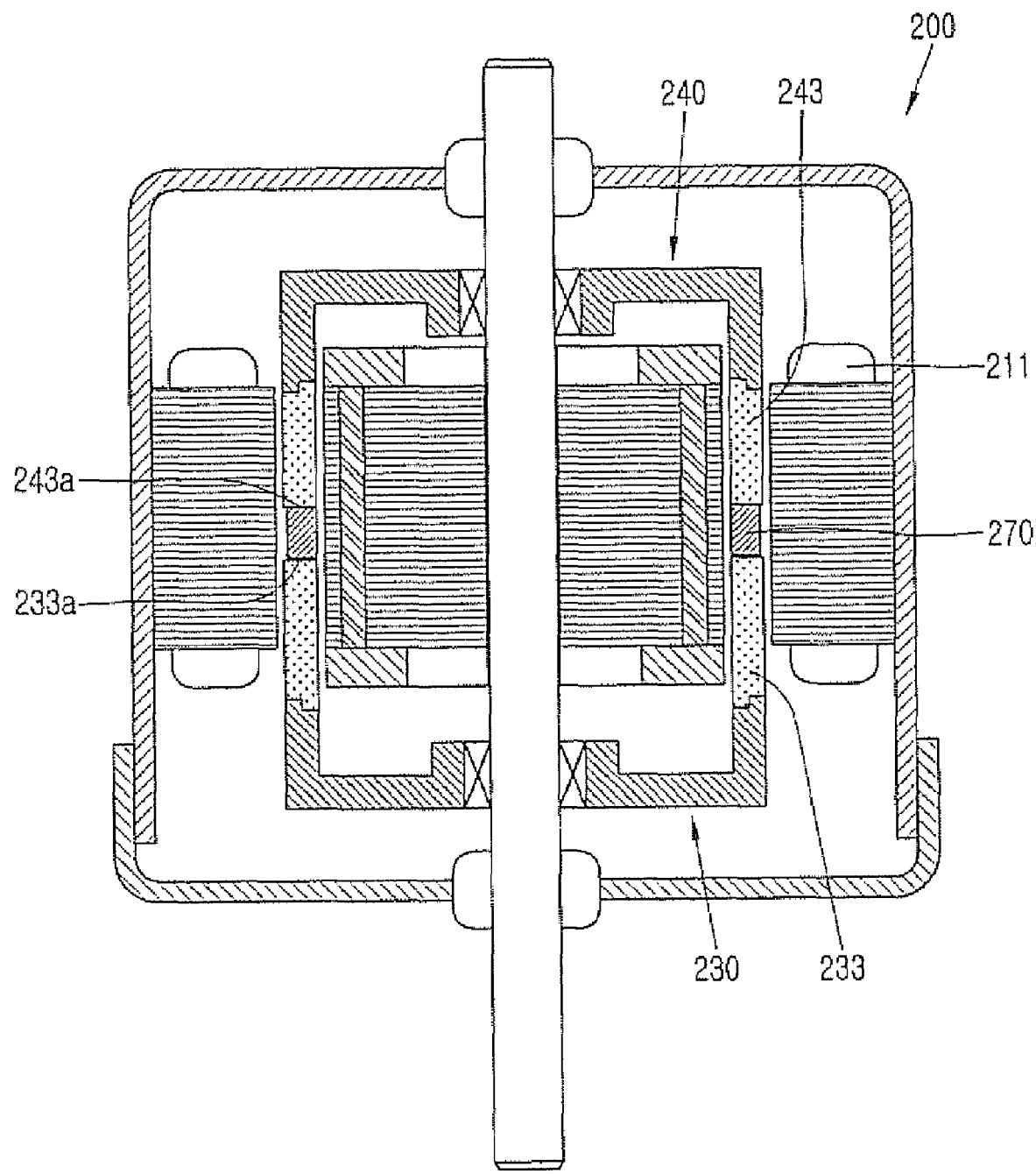
FIG. 9 is a longitudinal section view showing a hybrid induction motor according to another embodiment of the present invention.

FIG. 3 is a longitudinal section view showing a hybrid induction motor according to a first embodiment of the present invention, FIG. 4 is a sectional view taken along line II-II of FIG. 3, FIG. 5 is a perspective view showing a synchronous rotor and an induction rotor in the hybrid induction motor according to a first embodiment of the present invention, FIGS. 6 to 8 are schematic views showing each position of a first synchronous rotor and a second synchronous rotor at the time of starting and speed-varying the hybrid induction motor according to a first to embodiment of the present invention, and FIG. 9 is a longitudinal section view showing a hybrid induction motor according to another embodiment of the present invention.

As shown, a hybrid induction motor according to a first embodiment of the present invention 100 comprises a stator 110 fixedly installed in a casing 110a, an is induction rotor 120 rotatably inserted into a center of the stator 110 and having a shaft 121 at a center thereof, a first synchronous rotor 130 slid in a longitudinal direction of the shaft 121 between the stator 110 and the induction rotor 120 and free-rotatably installed in a circumferential direction of the shaft 121, and a second synchronous rotor 140 facing the first synchronous rotor 130, slid in a longitudinal direction of the shaft 121 between the stator 110 and the induction rotor 120, and free-rotatably installed in a circumferential direction of the shaft 121.

A coil winding portion 116 for winding a driving coil 111 of the stator 110 so that the stator 110 can have a polarity of an N pole or an S pole is formed at one side of the stator 110.

A hole 123 for inserting the shaft 121 is formed at a center of the induction rotor 120, and a plurality of conductive holes 124 are formed at an outer periphery portion of the induction rotor 120 with the same interval in a circumferential direction. A conductive bar 125 is installed at the conductive hole 124.

The conductive bar 125 is formed by a die casting, and is formed of aluminum or copper. An end ring 125a formed of aluminum is formed at the end of the conductive bar 125.

The first synchronous rotor 130 comprises a first support portion 131 to a center thereof the shaft 121 is rotatably coupled, a first magnet portion 133 having a cylindrical shape and coupled to the end of the first support portion 131 in a circumferential direction thus to be rotated by a rotating magnetic field of the stator 110 for rotating the induction rotor 120, and a first bearing portion 135 disposed at the center of the first support portion 131 for inserting the shaft 121.

The second synchronous rotor 140 comprises a second support portion 141 to a center thereof the shaft 121 is rotatably coupled, a second magnet portion 143 having a cylindrical shape and coupled to the end of the second support portion 141 in a circumferential direction thus to be rotated by a rotating magnetic field of the stator 110 for rotating the induction rotor 120, and a second bearing portion 145 disposed at the center of the second support portion 141 for inserting the shaft 121.

The first magnet portion 133 and the second magnet portion 143 are respectively constructed to have a plurality of poles. The first magnet portion 133 and the second magnet portion 143 are respectively mounted in a radial direction. An N pole and an S pole are alternately formed at the first magnet portion 133 and the second magnet portion along each circumferential direction.

A length of the shaft 121 of the first magnet portion 133 in a longitudinal direction is relatively longer than a length of the shaft 121 of the second magnet portion 143 in a longitudinal direction.

The first support portion 131 and the first magnet portion 133 are integrally formed by a molding, and the second support portion 141 and the second magnet portion 143 are integrally formed by a molding.

Preferably, the first bearing portion 135 and the second bearing portion 145 are respectively formed of an oilless bearing so that the shaft 121 can be smoothly rotated.

An end 133a of the first magnet portion 133 and an end 143a of the second magnet portion 143 come in contact with each other. Under a state that the end 133a of the first magnet portion 133 and the end 143a of the second magnet portion 143 come in contact with each other, the first synchronous rotor 130 and the second synchronous rotor 140 can be slid in a longitudinal direction of the shaft 121 and can be free-rotatable in a circumferential direction of the shaft 121.

A first air gap (t1) is formed between the first synchronous rotor 130 and the stator 110, and a second air gap (t2) is formed between the first synchronous rotors 130 and the induction rotor 120.

Hereinafter, an operation of the hybrid induction motor according to the first embodiment of the present invention will be explained with reference to FIGS. 3 to 8.

Once a rotating magnetic field is formed as a first current is sequentially applied to the driving coil 111 of the stator 110, the first synchronous rotor 130 and the second synchronous rotor 140 are synchronized by the rotating magnetic field thereby to be rotated at a synchronous speed.

A magnetic flux generated from the first magnet portion 133 and the second magnet portion 143 serves as a rotating magnetic field of the induction rotor 120, so that the induction rotor 120 is rotated. An output of the induction rotor 120 is transmitted outwardly through the shaft 121 fixed thereto.

Before the first synchronous rotor 130 and the second synchronous rotor 140 are synchronized, the first synchronous rotor 130 and the second synchronous rotor 140 are rotated up to a speed prior to a synchronous speed with a state except states shown in FIGS. 6 and 7 where each pole of the first synchronous rotor 130 and the second synchronous rotor 140 are arbitrarily facing each other.

When the firs synchronous rotor 130 and the second synchronous rotor 140 have been synchronized, a voltage applied to the driving coil 111 is great and thus a magnetic force from the stator 110 is much greater than an attractive force between different poles of the first synchronous rotor 130 and the second synchronous rotor 140. In this case, as shown in FIGS. 6 and 7, the first synchronous rotor 130 and the second synchronous rotor 140 are facing to each other with a state of N-N and S-S or a state of N-S and S-N, and are rotated at a synchronous speed. Herein, the rotating magnetic field formed at each inner side of the first synchronous rotor 130 and the second synchronous rotor 140 becomes maximum, and thus the induction rotor 120 has a maximum rotation speed.

On the contrary, when a voltage applied to the driving coil 111 is less and thus a magnetic force from the stator 110 is not greater than an attractive force between different poles of the first synchronous rotor 130 and the second synchronous rotor 140, the first synchronous rotor 130 and the second synchronous rotor 140 are rotated at a synchronous speed with same poles thereof being overlapped a little as shown in FIG. 8. Herein, the rotating magnetic field formed at each inner side of the first synchronous rotor 130 and the second synchronous rotor 140 becomes weak, and thus the induction rotor 120 has a decreased rotation speed.

In the hybrid induction motor according to the first embodiment of the present invention, if the rotating magnetic field generated from the driving coil 111 is weak while a state conversion from FIG. 6 into FIG. 7 is performed, the first synchronous rotor 130 and the second synchronous rotor 140 are alternately synchronized with the rotating magnetic field of the driving coil 111. Accordingly, the number of poles of the first synchronous rotor 130 and the second synchronous rotor 140 is increased by approximately two times. As the result, the rotating magnetic field for rotating the first synchronous rotor 130 and the second synchronous rotor 140 at a synchronous speed can be greatly lowered at the time of an initial driving of the hybrid induction motor. In a process that the first synchronous rotor 130 and the second synchronous rotor 140 are alternately synchronized, vibration can be generated in a direction of the shaft 121. However, the vibration can be prevented by controlling a shaft-direction length of an intermediate 270 part that will be later explained or a shaft-direction length of an over hang portion 130a of the first synchronous rotor 130, that is, a portion exposed more outwardly than the stator 110.

FIG. 9 is a longitudinal section view showing a hybrid induction motor according to another embodiment of the present invention.

As shown, in a hybrid induction motor 200 according to another embodiment of the present invention, a first magnet portion 233 of a first synchronous rotor 230 and a second magnet portion 243 of a second synchronous rotor 240 can have a predetermined gap therebetween by an intermediate part 270. Preferably, the intermediate part 270 is a non-magnetic substance.

One surface of the intermediate part 270 is fixed to an end 233a of the first magnet portion 233, and another surface of the intermediate part 270 is in contact with an end 243a of the second magnet portion 243.

An operation of the hybrid induction motor according to another embodiment of the present invention is the same as that of the hybrid induction motor according to the first embodiment of the present invention, and thus its detail explanation will be omitted.

In the hybrid induction motor having a double permanent magnet structure according to the present invention, a starting current is greatly lowered at the time of initially driving the hybrid induction motor thus to reduce noise and to enhance an efficiency of the motor. Furthermore, since a magnetic flux of the synchronous rotor is varied according to a variation of an applied voltage, a rotation speed of the hybrid induction motor can be freely varied and thus the hybrid induction motor can be applied to various products.

What is claimed is:

1. A hybrid induction motor, comprising:
    a first synchronous rotor slidable in a direction of a shaft during operation, and installed between a stator and an induction rotor; and
    a second synchronous rotor facing the first synchronous rotor in an axial direction, slidable in a direction of the shaft during operation, and installed between the stator and the induction rotor.

2. The hybrid induction motor of claim 1, wherein the first synchronous rotor comprises:
    a first support portion rotatably coupled to the shaft,
    a first magnet portion coupled to an end of the first support portion in a circumferential direction of the first support portion and rotated by a rotating magnetic field of the stator, to thereby rotate the induction rotor; and
    a first bearing portion disposed at the center of the first support portion for inserting the shaft, and
    the second synchronous rotor comprises:
    a second support portion rotatably coupled to the shaft;
    a second magnet portion coupled to an end of the second support portion in a circumferential direction of the second support portion and rotated by a rotating magnetic field of the stator, to thereby rotate the induction rotor, and
    a second bearing portion disposed at the center of the second support portion for inserting the shaft.

3. The hybrid induction motor of claim 2, wherein the first bearing portion is an oilless bearing, the first support portion is a non-magnetic substance, the second bearing portion is an oilless bearing, and the second support portion is a non-magnetic substance.

4. The hybrid induction motor of claim 2, wherein the first support portion and the first magnet portion are integrally formed, and the second support portion and the second magnet portion are integrally formed.

5. The hybrid induction motor of claim 2, wherein a length of the first magnet portion in a shaft longitudinal direction is relatively longer than a length of the second magnet portion in a shaft longitudinal direction.

6. The hybrid induction motor of claim 2, wherein an end of the first magnet portion and an end of the second magnet portion come in sliding contact with each other.

7. The hybrid induction motor of claim 2, wherein an intermediate part maintains a predetermined gap between the first magnet portion of the first synchronous rotor and the second magnet portion of the second synchronous rotor.

8. The hybrid induction motor of claim 7, wherein the intermediate part is a non-magnetic substance.

9. A hybrid induction motor, comprising:
    a stator fixedly installed in a casing;
    an induction rotor rotatably inserted into a center of the stator and having a shaft at a center thereof;
    a first synchronous rotor slidable in a direction of the shaft during operation, and installed between the stator and the induction rotor so as to rotate freely in a circumferential direction of the shaft; and
    a second synchronous rotor facing the first synchronous rotor in an axial direction, slidable in a direction of the shaft during operation, and installed between the stator and the induction rotor so as to rotate freely in a circumferential direction of the shaft.

10. The hybrid induction motor of claim 9, wherein the first synchronous rotor comprises:
a first support portion rotatably coupled to the shaft;
a first magnet portion coupled to an end of the first support portion in a circumferential direction of the first support portion, and rotated by a rotating magnetic field of the stator, to thereby rotate the induction rotor; and
a first bearing portion disposed at the center of the first support portion for inserting the shaft, and
the second synchronous rotor comprises:
a second support portion rotatably coupled to the shaft;
a second magnet portion coupled to an end of the second support portion in a circumferential direction of the second support portion, and rotated by a rotating magnetic field of the stator, to thereby rotate the induction rotor; and
a second bearing portion disposed at the center of the second support portion for inserting the shaft.

11. The hybrid induction motor of claim 10, wherein the first bearing portion is an oilless bearing, and the first support portion is a non-magnetic substance.

12. The hybrid induction motor of claim 10, wherein the second bearing portion is an oilless bearing, and the second support portion is a non-magnetic substance.

13. The hybrid induction motor of claim 10, wherein the first support portion and the first magnet portion are integrally formed.

14. The hybrid induction motor of claim 10, wherein the second support portion and the second magnet portion are integrally formed.

15. The hybrid induction motor of claim 10, wherein a length of the first magnet portion in a shaft longitudinal direction is relatively longer than a length of the second magnet portion in a shaft longitudinal direction.

16. The hybrid induction motor of claim 10, wherein an intermediate part maintains a predetermined gap between the first magnet portion of the first synchronous rotor and the second magnet portion of the second synchronous rotor.

17. The hybrid induction motor of claim 16, wherein the intermediate part is a non-magnetic substance.

18. The hybrid induction motor of claim 9, wherein an end of the first magnet portion and an end of the second magnet portion come in sliding contact with each other.

* * * * *